F. O. H. FINCKE.
PRESSURE GAS VALVE.
APPLICATION FILED FEB. 27, 1908.

904,057.

Patented Nov. 17, 1908.

2 SHEETS—SHEET 1.

WITNESSES.
A. Redmond.
A. A. Hoffy.

INVENTOR.
F. O. H. Fincke
BY
Criswell & Criswell
ATTORNEYS

F. O. H. FINCKE.
PRESSURE GAS VALVE.
APPLICATION FILED FEB. 27, 1908.
904,057.
Patented Nov. 17, 1908.
2 SHEETS—SHEET 2.
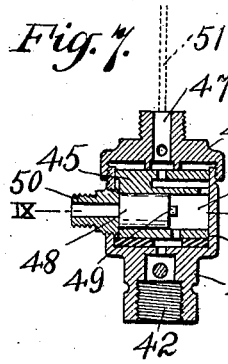
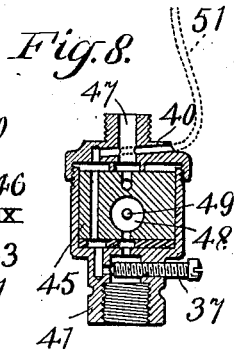
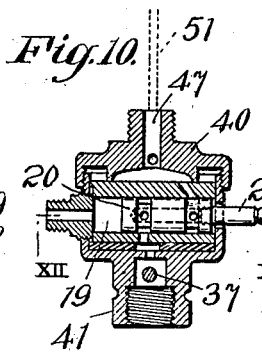
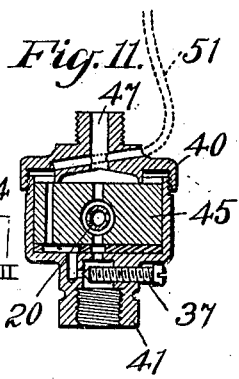
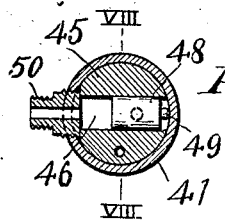
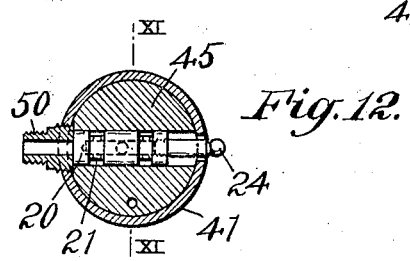
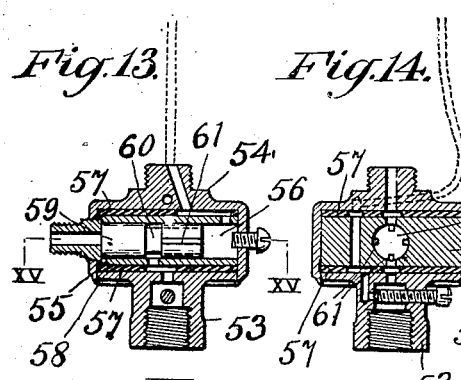
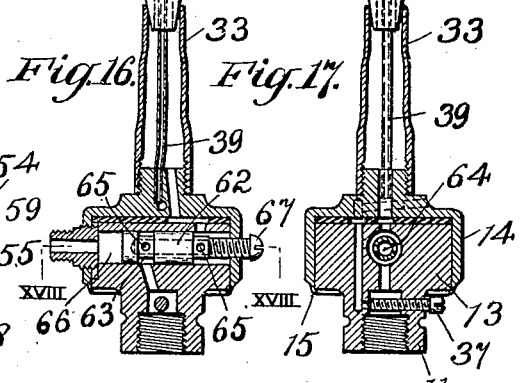
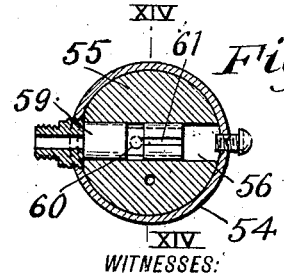
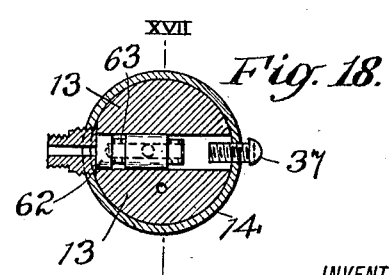
WITNESSES:
A. Redmond
H. A. Haffey
INVENTOR
F. O. H. Fincke
BY
Criswell & Criswell
ATTORNEYS

UNITED STATES PATENT OFFICE.

FRED O. H. FINCKE, OF LONG ISLAND CITY, NEW YORK.

PRESSURE GAS-VALVE.

No. 904,057.　　　　Specification of Letters Patent.　　　Patented Nov. 17, 1908.

Application filed February 27, 1908.　Serial No. 418,136.

*To all whom it may concern:*

Be it known that I, FRED O. H. FINCKE, a subject of the Emperor of Germany, and a resident of Long Island City, county of Queens, and State of New York, have invented certain new and useful Improvements in Pressure Gas-Valves, of which the following is a full, clear, and exact description.

This invention relates more particularly to means by which the gas to a burner may be automatically turned on or off from a distant point.

The primary object of the invention is to provide a simple and efficient device in which the casing is constructed of a plurality of independent members so made that the said parts or members may be readily secured and held to each other, and the parts of such a form that they can be easily made and finished into an attractive and effective casing; to provide movable means, as a piston, which may be operated from a distant point to cut off or turn on the supply of gas to the burner; and to provide means whereby the operating device for moving the piston may be readily attached to the device.

A further object of the invention is to provide a simple and effective piston which is movably held in the casing to regulate the supply of gas to the burner; and to provide means whereby a pilot or igniter supply-pipe may be attached to and form a part of the device, and which device may be applied to the ordinary type of burner or may be attached to the usual Bunsen burner, thus adapting the device to be employed in various ways and to avoid the necessity of striking matches when it is desired to light the gas.

With these and other objects in view the invention will be hereinafter more particularly described with reference to the accompanying drawings, which form a part of this specification, and will then be pointed out in the claims at the end of the description.

Figure 1:
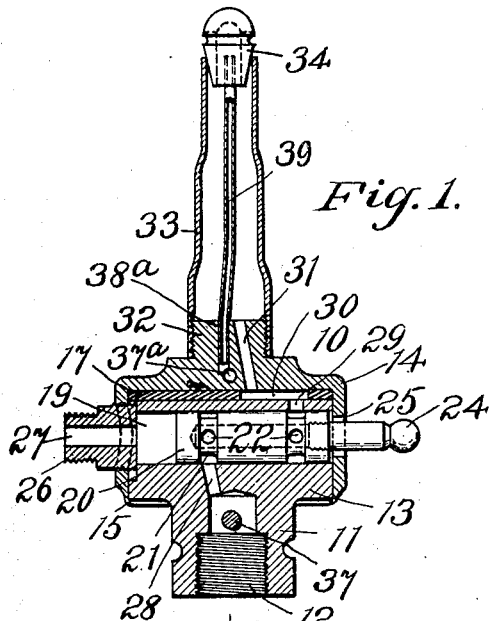
Figure 3:
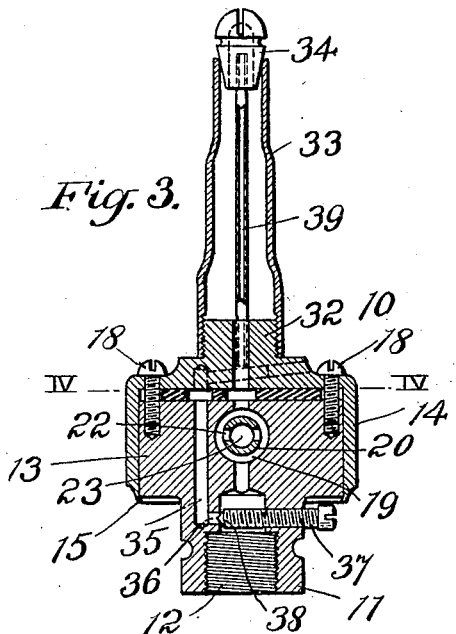
Figure 2:
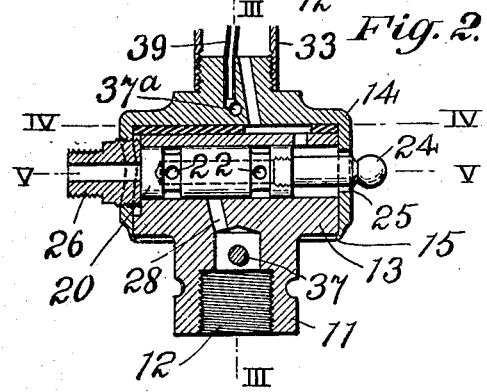
Figure 4:
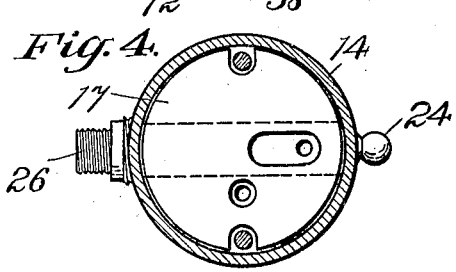
Figure 5:
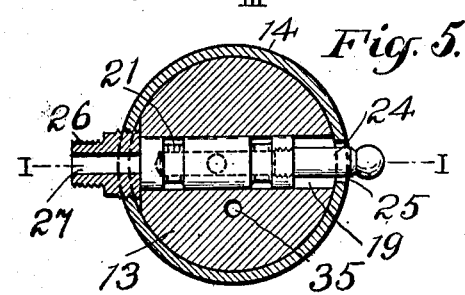
Figure 6:
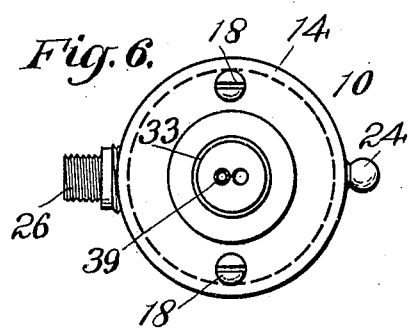

In the drawings, Figure 1 is a vertical section, partly in elevation, of one form of device embodying my invention. Fig. 2 is a fragmentary vertical section similar to Fig. 1 except that the piston is in position to shut off the supply of gas to the burner. Fig. 3 is a vertical transverse section taken on the line III—III of Fig. 2. Fig. 4 is a sectional plan view taken on the line IV—IV of Figs. 2 and 3. Fig. 5 is a section taken on the line V—V of Fig. 2. Fig. 6 is a plan view. Figs. 7 to 9 illustrate a device having a slightly different form of casing and piston for regulating the supply of gas; and Figs. 10 to 18 show other constructions of device.

The casing 10 of Figs. 1 to 6 comprises a gas supply member 11 which has a screw-threaded opening 12 adapted to fit over the usual gas-supply fitting or connection, and this member has an enlarged collar or head portion 13, over which is adapted to fit a cap or member 14. The members 11 and 14 are cylindrical in form, so that they may be readily made, and the head portion 13 fits into a recess or opening in the cap or burner member 14, and may be joined thereto and rigidly held together by beading or turning the end 15 of the member 14 under the head 13, so as to positively hold the members together. A disk, gasket or washer 17 may be interposed between the upper face of the member 11, and the opposed surface of the member 14, to form a tight joint therewith, and as an additional means for securing the members 11 and 14 together, I may provide screws or bolts 18, though the latter may be dispensed with or other means substituted therefor if desired. By this means, the casing 10 may be readily and cheaply made and finished, so as to provide an attractive appearance, as well as an effective casing.

To cut off or open the supply of gas, I arrange an opening 19 which extends through the head 13 of the member 11, and in this opening is movably held a cut-off or piston 20. As shown the piston 20 is provided with two annular grooves 21, and transverse openings 22 arranged in said grooves. These transverse openings 22 communicate with the opening 19 of the member 11, and with each other by means of a longitudinally-extending opening or channel 23 arranged in the piston, and which makes the piston hollow and much lighter than it would be if solid. One end of the opening 23 is closed by a plug or handle 24, and this handle projects outwardly through an opening 25 in the member 14 by which the said piston may be moved manually should this be necessary or desirable; but to operate the piston automatically a bushing 26 or other means is secured to the member 14, and has an opening 27 therethrough which communicates with the opening 19 of the member 11. To this bushing 26 may be connected the usual or any preferred form of operating means such as a tubular connection, and a cylinder in which a piston is movable and operated by a push button, or otherwise, so that air may be forced through the opening 27 to move the piston in one direction, or to create suction to move the piston in the opposite direction. In one position of the piston the gas-supply is free to pass through the piston, and in the other the gas-supply is cut off. The member 11 has a port or channel 28 forming a communication between the main opening 12 and the opening 19, and to one side of the port 28 is a port or opening 29, which communicates by means of a slot 30 in the washer or gasket 17 with a channel or opening 31 in the member 14. The member 14 is provided with a screw-threaded part 32, and to this part is attached the burner or member 33 in the outer open end of which is the usual or any preferred form of gas-tip 34. As will be seen when the piston is in the position shown in Fig. 1, the annular grooves 21 will register with the ports 28 and 29, so that gas may pass from the source of supply through the piston, and through the opening 31 to the burner, but when in the position shown in Fig. 2 the supply of gas will be entirely cut off.

The burner may be of the usual form or it may be arranged so that air and gas may mingle as in the ordinary Bunsen burner, and when the piston is operated in the manner shown, I provide means for automatically lighting the gas as it escapes from the burner. As shown a channel or opening 35 is made in the member 11, and this channel communicates with the main supply opening 12 by means of a transverse short opening or channel 36. In the casing is a screw 37, or other means, which has its end arranged to form a valve 38 so as to entirely close and regulate the supply of gas which is to pass through the channel 35. This channel 35 extends upwardly through the gasket 17 and into the member 14, and by means of a transverse opening 37$^a$ communicates with an opening 38$^a$. The channel 37$^a$ may be formed by drilling an opening through the casing and then inserting a plug 38$^b$ to close the same as shown in dotted lines in Fig. 3. A pilot or an igniting supply-pipe 39 projects upwardly from the opening 38$^a$ to a point adjacent to the burner tip, and this pilot is intended to remain ignited so that immediately the gas is turned on by shifting the piston as already explained, the pilot, which remains lighted all the time, will immediately ignite the gas. In this way the gas may be turned off or on and automatically lighted or extinguished from a distant point.

In Figs. 7 to 9, the casing comprises a cap member 40, which has a screw-threaded end, and is adapted to engage the threaded end of the member 41. This member 41 has the usual threaded opening 42 for attachment to the gas-supply fixture, and in the recess 43 under the cap 40 is arranged an annular or cylindrical member 45 through which is an opening 46. The opening 46 communicates with the opening 47 of the cap 40, and with the opening 42 through the ports and channels which extend through the member 43 and the member 41. A piston 48 is movable in the opening 46, and this piston is solid and cylindrical, and is provided with a small projection 49, which is adapted to engage the side of the member 41, and is operated through the plug or fitting 50, and the means connected therewith as already explained. In this construction the pilot is shown in dotted lines at 51, and has the gas supplied thereto by means of channels located at the side of the opening 46, and said pilot in this and in the other constructions may be arranged in any desired way.

Figs. 10 to 12 show substantially the same form of casing as in Figs. 7 and 8, but provides a piston of substantially the same form as shown in Figs. 1 to 6, the arrangement of the ports and channels being slightly different for the passage of the gas to the burner and to the pilot.

In Figs. 13 to 15, the casing comprises a member 53 to which is held the cap member 54, and in the cap member above the member 53 is a disk-like member 55, through which is an opening 56. On each side of the member 55 is a gasket or packing 57 by which a tight joint is secured between the several members, and said members may be held together by beading and forcing inward the end 58 of the member 54 as described in connection with Figs. 1 and 2. The piston 59 is slightly different from the other forms, and is provided with an annular groove 60 and horizontally-extending and peripheral grooves 61 on one side of the groove 60, so that the gas may pass into the annular groove 60 and through the grooves 61 to the burner.

The construction of device shown in Figs. 16 to 18 is substantially the same as disclosed in Figs. 1 to 6, and differs principally in the form of piston used. In this case the piston 62 has an annular groove 63 which communicates with an opening 64 within the piston by means of transverse openings 65, and said piston is adapted to move in the opening 66 as already explained. The piston may be moved by any suitable means to cut off or open the supply of gas to the burner, and this open movement may be regulated by a screw 67 against which the piston may rest when forced to the position shown in Fig. 16.

From the foregoing it will be seen that a simple and efficient device is constructed in which the gas may be automatically cut off or turned on from a distant point; that the casing may be readily made and the members comprising the same quickly attached together, and the whole easily finished or polished as all the parts are cylindrical and therefore readily made; that the piston or cut-off is so constructed that it is light and easily made, and may be manually as well as automatically operated, and that said piston and parts are not likely to get out of order.

Having thus described my invention, I claim as new and desire to secure by Letters Patent:—

1. In a device of the character described, a casing provided with ports and having a cylindrical gas-supply member and a cylindrical burner member adapted to communicate respectively with the gas-supply and the burner, a gasket interposed between the members and forming a seal between the same, one of said members being provided with an opening therethrough and fitting into the other member, and a piston movable in the opening and controlling the ports of the casing.

2. In a device of the character described, a casing provided with an opening and with ports and having a cylindrical gas-supply member and a cylindrical burner member adapted to communicate respectively with the gas-supply and the burner, means forming a seal between the members and a piston movable in the opening of the casing and controlling said ports.

3. In a device of the character described, a casing having ports therein for the passage of gas, and having a burner member and a gas-supply member adapted to communicate respectively with the burner and with the gas-supply and arranged so that their inner faces will be opposed, a gasket interposed between the members and forming a seal between the same, one of said members being provided with an opening therethrough, a piston movable in the opening and controlling the gas ports in the casing, means whereby the piston may be moved, and a burner attached to the burner member.

4. In a device of the character described, a casing having ports therein for the passage of gas and having a cylindrical burner member and a cylindrical gas-supply member adapted to communicate respectively with the burner and with the gas-supply and arranged so that their inner faces will be opposed, means forming a seal between the members, one of the members of the casing being provided with an opening therethrough, a piston movable in the opening and controlling the gas ports in the casing and means whereby the piston may be moved.

5. In a device of the character described, a casing having suitable gas ports therein and comprising a plurality of cylindrical members adapted to communicate respectively with the gas-supply and a burner, one of said members being provided with an opening therethrough and fitting into another member, and a piston movable in the opening and controlling the ports.

6. In a device of the character described, a casing comprising a plurality of members one of which is adapted to fit into the other, means whereby the members may be held together, means providing a tight joint between said members, one of said members being provided with an opening therethrough, a hollow piston movably held in the opening and having transverse openings so that the gas may pass from without to within the piston, means for supplying gas to the piston, a handle carried by the piston so that the latter may be manually operated, means whereby the piston may be automatically moved, a burner, said casing having ports forming a communication between the source of gas-supply and the burner and controlled by the movement of said piston, a pilot, and means for supplying gas to the pilot so that the latter may remain constantly lighted.

7. In a device of the character described, a casing comprising a plurality of cylindrical members one of which is adapted to fit into the other, means whereby the members may be held together and a tight joint formed between the same, one of said members being provided with an opening therethrough, a piston movable in said opening, a handle carried by the piston so that the latter may be manually operated, means whereby the piston may be automatically moved, a burner, said casing having ports controlled by the movement of the piston and forming a communication between the source of gas-supply, the opening in which the piston moves, and the burner.

8. In a device of the character described, a casing comprising a plurality of cylindrical members one of which is adapted to fit into the other, means whereby the members may be held together, a gasket providing a tight joint between the members, one of said members being provided with an opening therethrough, a hollow piston movably held in said opening, a handle carried by the piston so that the latter may be manually operated, means whereby the piston may be automatically moved, a burner, said casing having ports controlled by the movement of the piston and forming a communication between the source of gas-supply, the opening in which the piston moves, and the burner, a pilot, and means for supplying gas to the pilot so that the latter may remain constantly lighted.

9. The combination with a casing comprising a plurality of cylindrical members, of a piston movable in the casing and provided with an inner opening extending lengthwise thereof and annular grooves around the periphery thereof and having transverse openings forming a connection between the inner opening of the piston and said annular grooves, means for controlling the position of the piston, said casing having ports on opposite sides of the piston for the passage of the gas and controlled by said piston.

10. The combination with a casing, of a piston located in the casing and provided with an inner opening extending lengthwise thereof and annular grooves around the periphery thereof and having transverse openings forming a connection between the inner opening of the piston and said annular grooves, means for controlling the movement of the piston, said casing having ports on opposite sides of the piston for the passage of the gas and controlled by said piston.

11. The combination with a casing comprising a plurality of cylindrical members, of a piston located in the casing and provided with an inner opening extending lengthwise thereof and annular grooves around the periphery thereof and having transverse openings forming a connection between the inner opening of the piston and said annular grooves, means for controlling the position of the piston, a burner, means forming a communication between the gas-supply and the burner, and means for automatically lighting the burner when the gas is turned on.

12. The combination with a casing, of a piston located in the casing and provided with an inner opening extending lengthwise thereof and annular grooves around the periphery thereof and having transverse openings forming a connection between the inner opening of the piston and said annular grooves, means for controlling the movement of the piston, a burner, and means to supply gas to and through the piston to the burner, and means for lighting the burner when the gas is turned on.

This specification signed and witnessed this 21 day of Feby. A. D. 1908.

FRED O. H. FINCKE.

Witnesses:
GEORGE D. FRENZ,
MAX STEINER.